(12) United States Patent
Hayashi et al.

(10) Patent No.: US 7,246,670 B2
(45) Date of Patent: Jul. 24, 2007

(54) WORK VEHICLE WITH HYDROSTATIC STEERING SYSTEM

(75) Inventors: Kazuhiko Hayashi, Komatsu (JP); Mitsuaki Nakamura, Ishikawa (JP)

(73) Assignee: Komatsu Ltd., Tokyo (JP)

( * ) Notice: Subject to any disclaimer, the term of this patent is extended or adjusted under 35 U.S.C. 154(b) by 328 days.

(21) Appl. No.: 11/040,594

(22) Filed: Jan. 21, 2005

(65) Prior Publication Data
US 2005/0183416 A1   Aug. 25, 2005

(30) Foreign Application Priority Data
Feb. 25, 2004 (JP) .............................. 2004-049071
Dec. 15, 2004 (JP) .............................. 2004-362517

(51) Int. Cl.
*B62D 6/08* (2006.01)
(52) U.S. Cl. ................... 180/6.2; 180/6.3; 180/6.48; 180/6.44; 180/6.7; 180/305; 701/50; 701/51; 701/52
(58) Field of Classification Search ............. 180/6.2, 180/6.3, 6.48, 6.44, 6.7, 305; 701/50, 51, 701/52
See application file for complete search history.

(56) References Cited

U.S. PATENT DOCUMENTS

| 3,966,005 | A | * | 6/1976 | Binger ...................... 180/6.44 |
| 4,184,387 | A | * | 1/1980 | Kiritani et al. ............... 475/22 |
| 4,548,098 | A | * | 10/1985 | Besson et al. ................ 475/32 |
| 5,089,964 | A | * | 2/1992 | Morishige et al. ............ 701/51 |
| 5,101,919 | A | * | 4/1992 | Ossi ........................... 180/6.2 |
| 5,503,232 | A | * | 4/1996 | Matsushita et al. ............ 172/2 |
| 5,569,109 | A | * | 10/1996 | Okada ........................ 475/28 |
| 6,181,999 | B1 | * | 1/2001 | Yamamoto et al. ........... 701/50 |
| 6,574,541 | B2 | * | 6/2003 | Katakura et al. ............. 701/54 |
| 6,640,178 | B2 | * | 10/2003 | Wakamatsu et al. .......... 701/51 |
| 6,654,676 | B2 | * | 11/2003 | Nakagawa et al. ........... 701/50 |
| 2006/0167607 | A1 | * | 7/2006 | Nakamura et al. ............ 701/50 |

FOREIGN PATENT DOCUMENTS

JP          10-220359 A       8/1998

* cited by examiner

*Primary Examiner*—Lesley D. Morris
*Assistant Examiner*—Marlon Arce-Diaz
(74) *Attorney, Agent, or Firm*—Frishauf, Holtz, Goodman & Chick, P.C.

(57) ABSTRACT

A work vehicle with a hydrostatic steering system is disclosed which is capable of performing optimum control of the absorption torque of a hydraulic pump according to running load; capable of preferentially ensuring turning performance and implement speed when running load is relatively low; and capable of ensuring desired turning performance even when running load is relatively high. To this end, a bulldozer with a hydrostatic steering system, wherein the power of a hydraulic motor driven by pressure oil fed from a hydraulic pump operated by an engine is transmitted to right and left crawler tracks through a differential steering means composed of planetary gear trains etc., is designed to control the absorption torque of the hydraulic pump according to the speed ratio of a torque converter calculated by a speed ratio operation unit.

2 Claims, 6 Drawing Sheets

WORK VEHICLE WITH HYDROSTATIC STEERING SYSTEM

TECHNICAL FIELD

The present invention relates to a work vehicle with a hydrostatic steering system.

BACKGROUND ART

As a work vehicle of this type, there is known a bulldozer equipped with a pump absorption torque control unit such as disclosed in Japanese Patent Publication KOKAI No. 10-220359, according to which the power of the engine is transmitted to the right and left sprockets through a torque converter, a transmission, and a differential steering means composed of planetary gear trains etc., whereas the power of a hydraulic motor driven by pressure oil from a hydraulic pump operated by the engine is transmitted to the right and left sprockets through the differential steering means. The pump absorption torque control unit is designed such that when engine speed is high, the absorption torque of the hydraulic pump is increased thereby increasing the work rate and turning performance and when engine speed is low, the absorption torque of the hydraulic pump is reduced thereby ensuring traction ability, engine output recovery performance and the like. That is, in this bulldozer, running load and engine speed are correlated and the absorption torque (absorbed horsepower) of the hydraulic pump is controlled according to engine speed.

The above conventional bulldozer has, however, revealed the following problem. Since engine output torque, which is output from the engine to be input to the transmission through the torque converter, is converted into a desired magnitude of torque according to running load by the torque converter and the transmission to be output to a downstream power transmission mechanism, running load is not correctly reflected in engine speed in some cases. For this reason, optimum control of the absorption torque of the hydraulic pump according to running load cannot be performed. More specifically, for instance, when turning the vehicle with engine speed being reduced through deceleration to decrease vehicle speed, pump absorption torque decreases even though running load is relatively low, so that the flow rate of pressure oil discharged from the hydraulic pump to the hydraulic motor decreases, causing poor turning performance.

The present invention is directed to overcoming such a problem and a primary object of the invention is therefore to provide a work vehicle with a hydrostatic steering system capable of performing optimum control of the absorption torque of a hydraulic pump according to running load, preferentially ensuring turning performance and the speed of an implement when running load is relatively low, and ensuring desired turning performance even when running load is relatively high.

SUMMARY OF THE INVENTION

The above object can be accomplished by a work vehicle with a hydrostatic steering system according to the invention, in which the power of an engine is transmitted to right and left drive wheels through at least a torque converter and differential steering means, whereas the power of a hydraulic motor, which is driven by pressure oil from a hydraulic pump operated by the engine, is transmitted to the right and left drive wheels through the differential steering means,
the work vehicle comprising:
 speed ratio computing means for computing a speed ratio of the torque converter; and
 pump absorption torque controlling means for controlling the absorption torque of the hydraulic pump based on the speed ratio computed by the speed ratio computing means.

As used herein, "the speed ratio of the torque converter" refers to the ratio ($N_2/N_1$) of the revolution speed ($N_2$) of the torque converter at its output side to the revolution speed ($N_1$) of the torque converter at its input side. "The absorption torque of the hydraulic pump" refers to the torque which the hydraulic pump absorbs from the engine.

According to the invention, optimum control of the absorption torque of the hydraulic pump can be performed according to running load, by virtue of the provision of the speed ratio computing means for computing the speed ratio of the torque converter which decreases and increases according to increases/decreases in running load and provision of the pump absorption torque controlling means for controlling the absorption torque of the hydraulic pump based on the speed ratio of the torque converter which is computed by the speed ratio computing means. More specifically, if running load is relatively low, the absorption torque of the hydraulic pump will be controlled such that turning performance and implement speed are preferentially ensured. Even if running load is relatively high, the absorption torque of the hydraulic pump can be controlled so as to ensure desired turning performance.

DETAILED DESCRIPTION OF THE INVENTION

With reference to the accompanying drawings, a work vehicle with a hydrostatic steering system will be concretely described according to a preferred embodiment of the invention. It should be noted that this embodiment is associated with an instance where the invention is applied to a bulldozer serving as a work vehicle.

Figure 1:
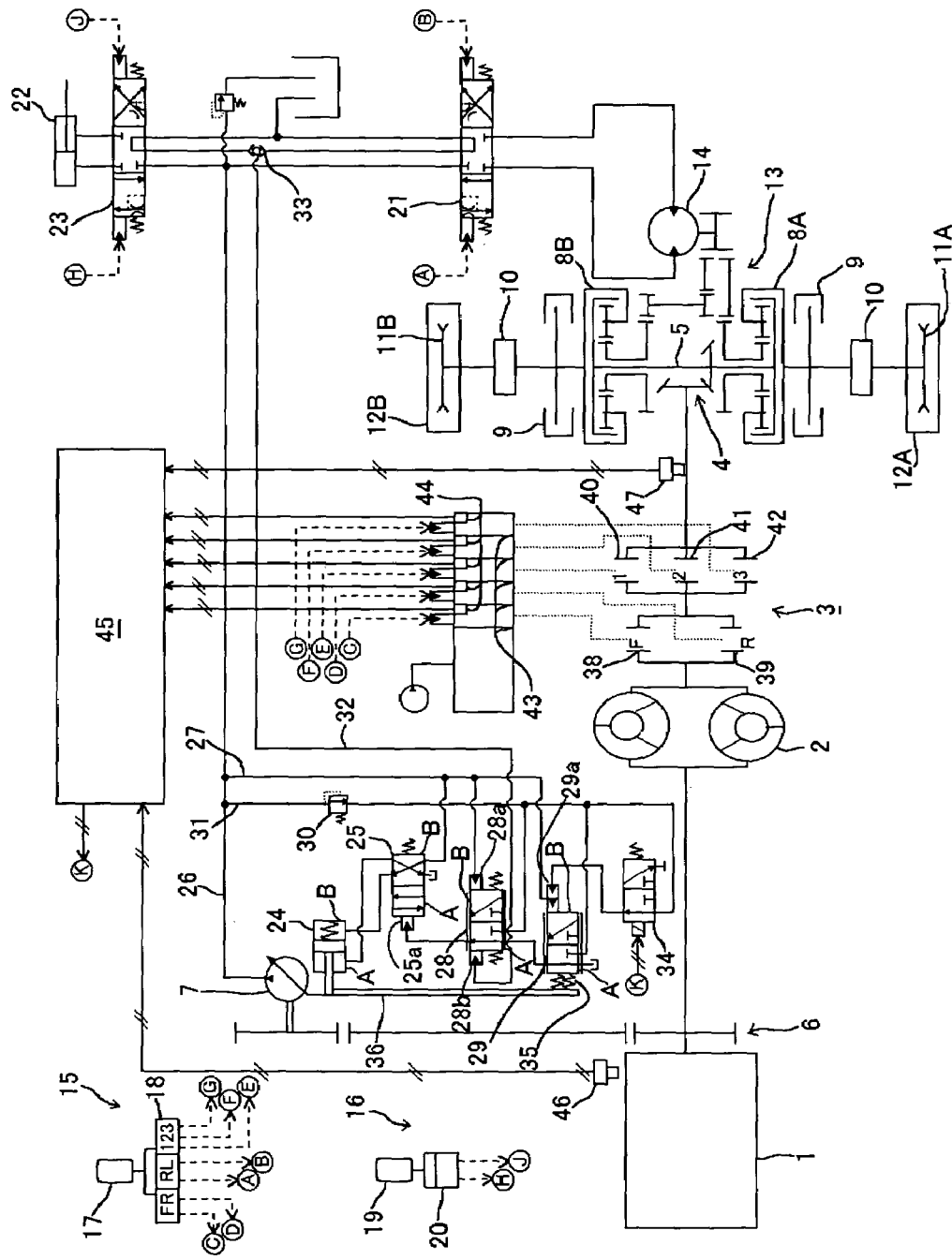
FIG. 1 is a schematic system diagram of a bulldozer with a hydrostatic steering system according to one embodiment of the invention.

FIG. 1 shows a schematic system diagram of a bulldozer with a hydrostatic steering system constructed according to one embodiment of the invention.

Turning to FIG. 1, the rotary driving force of an engine 1 is transmitted to a torque converter 2 and then to a transmission 3 from the output shaft of the torque converter 2. The force is then transmitted from the output shaft of the transmission 3 to a transverse shaft 5 through a bevel gear 4. The rotary driving force of the engine 1 is also transmitted to a variable displacement hydraulic pump 7 through a PTO 6.

Coupled to the transverse shaft 5 are left and right planetary gear trains 8A, 8B (corresponding to "the differential steering means" of the invention). An output shaft secured to a planetary carrier of the left planetary gear train 8A is coupled to a left sprocket (left drive wheel) 11A through a brake unit 9 and final reduction gears 10, whereas an output shaft secured to a planetary carrier of the right planetary gear train 8B is coupled to a right sprocket (right drive wheel) 11B through a brake unit 9 and final reduction gears 10. The left and right sprockets 11A, 11B mesh with crawler tracks 12A, 12B, respectively, arranged at the left and right sides of the vehicle body. The rotary driving forces which have been transmitted from the transverse shaft 5 to the respective ring gears of the left and right planetary gear trains 8A, 8B are then transmitted from the respective planetary carriers of the left and right planetary gear train 8A, 8B to the sprockets 11A, 11B respectively through the final reduction gears 10, 10, so that the crawler tracks 12A, 12B are driven by the sprockets 11A, 11B respectively.

A gear integrally secured to the sun gear of the left planetary gear train 8A and a gear secured to the sun gear of the right planetary gear train 8B mesh with gears secured to the output shaft of a hydraulic motor 14 through power transmission mechanisms 13 each consisting of a desired gear train. The rotary driving forces of the hydraulic motor 14 are transmitted from the respective sun gears of the left and right planetary gear trains 8A, 8B to the left and right sprockets 11A, 11B through the respective planetary carriers and final reduction gears 10, 10, whereby the revolution speeds of the left and right sprockets 11A, 11B are made different from each other, thereby turning the vehicle to the right or left.

An operator's cab (not shown) includes a travel/turn operating unit 15 for performing traveling and turning of the vehicle and an implement operating unit 16 for operating an implement such as a blade (not shown). Herein, the travel/turn operating unit 15 includes a travel/turn operating lever 17 for outputting a travel command or turn command and a pilot pressure oil outputting means (pressure reducing valve or the like) 18 for outputting desired pilot pressure oil in response to the travel or turn command from the travel/turn operating lever 17. The implement operating unit 16 includes an implement operating lever 19 for outputting an implement operation command and a pilot pressure oil outputting means (pressure reducing valve or the like) 20 for outputting desired pilot pressure oil in response to the implement operation command from the implement operating lever 19.

Formed between the hydraulic pump 7 and the hydraulic motor 14 is a steering switching valve 21 for feeding and discharging pressure oil discharged from the hydraulic pump 7 to and from the hydraulic motor 14. With the pilot pressure oil output from the pilot pressure oil outputting means 18 in response to the turn command from the travel/turn operating lever 17, desired oil path switching operation of the steering switching valve 21 is performed, which changes the rotating direction of the output shaft of the hydraulic motor 14 so that the vehicle is switched between left turning and right turning.

Formed between various hydraulic cylinders 22 for actuating the implement and the hydraulic pump 7 is an implement operating valve 23 for feeding and discharging the pressure oil discharged from the hydraulic pump 7 to and from the various hydraulic cylinders 22. Herein, the hydraulic cylinders 22 refers to hydraulic cylinders for a lift, angle and tilt which are parts constituting the implement of the bulldozer. Although FIG. 1 shows a circuit for only one hydraulic cylinder, other hydraulic cylinders have the same circuit configuration. With the pilot pressure oil output from the pilot pressure oil outputting means 20 in response to the implement operation command from the implement operating lever 19, desired oil path switching operation of the implement operating valve 23 is performed, thereby allowing the implement to perform desired operation.

The hydraulic pump 7 is formed such that its swash plate angle is controlled by a servo piston 24. A servo valve 25 for feeding and discharging control pressure oil to and from the servo piston 24 is connected to a first conduit 27 which blanches off from a discharge pipeline 26 of the hydraulic pump 7. An operating section 25a of the servo valve 25 is connected to a torque variable control valve 29 (hereinafter referred to as "TVC valve 29") through a load sensing valve 28 (hereinafter referred to as "LS valve 28"). The LS valve 28 controls discharge rate by sensing load. The TVC valve 29 controls the output of the hydraulic pump 7 so as to provide substantially equivalent horsepower. Herein, the TVC valve 29 is connected to a second conduit 31 which blanches off from the discharge pipeline 26 of the hydraulic pump 7 and has a self-pressure control valve 30 inserted therein. Likewise, the LS valve 28 is connected to the second conduit 31.

One operating section 28a of the LS valve 28 is connected to the first conduit 27, whereas the other operating section 28b of the LS valve 28 is connected to a third conduit 32. The highest one of load pressures, which include load pressures on the various hydraulic cylinders 22 detected by the implement operating valve 23 and a load pressure on the hydraulic motor 14 detected by the steering switching valve 21, is selected by a highest pressure selecting type shuttle valve 33 and is introduced into the third conduit 32. In this way, the LS valve 28 is controlled by differential pressure, i.e., the difference between the discharge pressure of the hydraulic pump 7 and the load pressure of one of the various hydraulic cylinders 22/the hydraulic motor 14.

An operating section 29a of the TVC valve 29 is connected to the first conduit 27 and to the second conduit 31 through a control valve 34 which is operated in response to a control current. The TVC valve 29 is provided with two springs 35 which are in contact with a pressing member 36 coupled to a piston of the servo piston 24. When pressed by a piston (not shown) of the TVC valve 29, the two springs 35 are bent, pushing the pressing member 36 to operate the servo piston 24 so that the swash plate angle of the hydraulic pump 7 is controlled. With this control, the discharge capacity of the hydraulic pump 7 becomes variable and the absorption horsepower of the hydraulic pump 7 is controlled as depicted by a substantially equivalent horsepower constant line (P(discharge pressure)×Q(discharge flow rate) =constant). In this embodiment, the servo piston 24, the servo valve 25, the LS valve 28, the TVC valve 29 etc. constitute a regulator for controlling the swash plate angle of the hydraulic pump. For controlling the TVC valve 29 of this regulator, the control valve 34 is provided. The pump absorption torque controlling means is constituted by (i) a first control unit 45c and (ii) a second control unit 45d which are for releasing a command value in the form of a control current to the control valve 34 (both units will be discussed later), and controls the absorption torque of the hydraulic pump 7.

The transmission 3 provides three speeds in both forward and reverse drive ranges and is composed of forward and reverse drive gears and first to third speed gears which consist of a plurality of gear trains (e.g., parallel shaft gear trains or planetary gear trains (not shown)). The forward drive gear is provided with a forward drive gear hydraulic clutch 38 for connecting and disconnecting power to and from the forward drive gear. The reverse drive gear is provided with a reverse drive gear hydraulic clutch 39 for connecting and disconnecting power to and from the reverse drive gear. The first speed gear is provided with a first speed gear hydraulic clutch 40 for connection and disconnection of power with respect to the first speed gear; the second speed gear is provided with a second speed gear hydraulic clutch 41 for connection and disconnection of power with respect to the second speed gear; and the third speed gear is provided with a third speed gear hydraulic clutch 42 for connection and disconnection of power with respect to the third speed gear. In addition, the transmission 3 includes a transmission operating valve 43 associated with the forward drive gear hydraulic clutch 38. The transmission operating valve 43 functions to feed and discharge operating pressure oil to and from the forward drive gear hydraulic clutch 38 thereby switching it between a connected state and a disconnected state. In the transmission 3, the reverse drive gear hydraulic clutch 39, the first speed gear hydraulic clutch 40, the second speed gear hydraulic clutch 41, and the third speed gear hydraulic clutch 42 are each provided with the transmission operating valve 43.

The transmission operating valve 43 associated with the forward drive gear hydraulic clutch 38 is equipped with a clutch operation detector 44 (e.g., a pressure sensor, hydraulic switch, micro-switch, etc.). This clutch operation detector 44 has the function of detecting that the transmission operating valve 43 is in a state where operating pressure oil is allowed to be introduced into the forward drive gear hydraulic clutch 38 to engage the clutch 38, and outputting the result of the detection in the form of a clutch operation signal. The transmission operating valves 43 for the reverse drive gear hydraulic clutch 39, the first speed gear hydraulic clutch 40, the second speed gear hydraulic clutch 41 and the third speed gear hydraulic clutch 42 respectively include a similar clutch operation detector 44.

Figure 2:
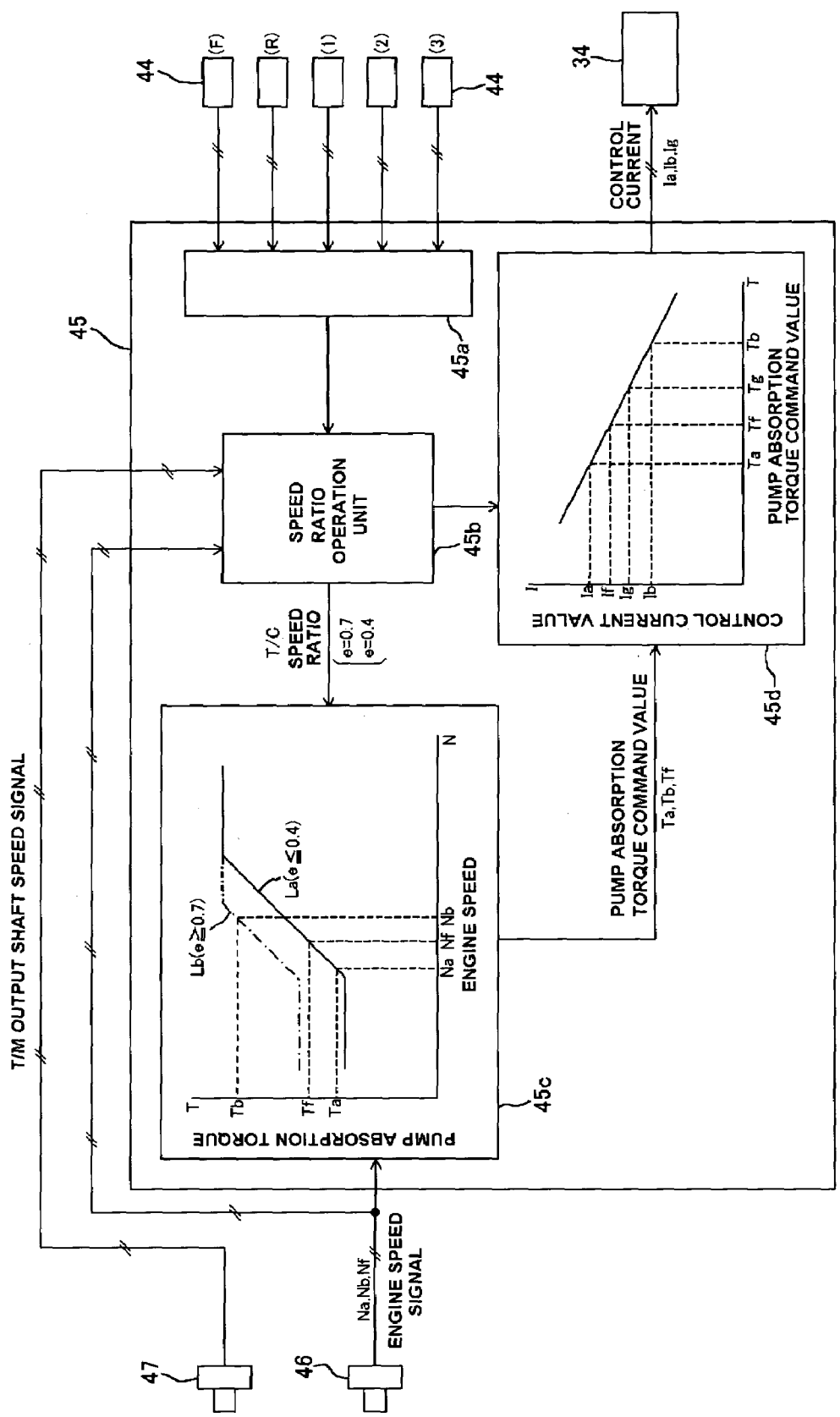
FIG. 2 is a block diagram of a fundamental part of a main controlling means.

The bulldozer of this embodiment has a controller 45 serving as the main controlling means. The controller 45 has, as shown in the block diagram of FIG. 2, a drive/speed gear identifying unit 45*a*, a speed ratio operation unit (speed ratio computing means) 45*b*, a first control unit 45*c* and a second control unit 45*d*.

Input to the drive/speed gear identifying unit 45*a* are clutch operation signals respectively issued from the clutch operation detectors 44. The drive/speed gear identifying unit 45*a* determines, based on the clutch operation signals, which of the drive and speed gears is presently selected and outputs the result of the determination to the speed ratio operation unit 45*b* as drive/speed gear data.

Input to the speed ratio operation unit 45*b* are drive/speed gear data from the drive/speed gear identifying unit 45*a*; an engine speed signal from an engine speed sensor 46 for detecting the actual engine speed of the engine 1; and a transmission output shaft speed signal from a transmission output shaft speed sensor 47 for detecting the actual revolution speed of the output shaft of the transmission 3. In the speed ratio operation unit 45*b*, the present reduction ratio of the transmission 3 is calculated based on the drive/speed gear data from the drive/speed gear identifying unit 45*a*, and the speed ratio e of the torque converter 2 is calculated using the following Equation (1) to send the result of the calculation to the first control unit 45*c* and to the second control unit 45*d* as torque converter speed ratio data.

$$e = N_3 \cdot i / N_1 \quad (1)$$

where $N_1$: the actual speed of the engine 1
i: the present reduction ratio of the transmission 3
$N_3$: the actual revolution speed of the output shaft of the transmission 3

Thus, the speed ratio e of the torque converter 2, which decreases and increases, according to an increase and drop in running load.

Input to the first control unit 45*c* are an engine speed signal from the engine speed sensor 46 and torque converter speed ratio data from the speed ratio operation unit 45*b*. A plurality of pump absorption torque characteristics, which are set in accordance with the speed ratio of the torque converter 2, are stored, in the form of maps, in the first control unit 45*c*. Each pump absorption torque characteristic is the correlation between the torque absorbed from the engine 1 by the hydraulic pump 7 (hereinafter referred to as "pump absorption torque") and engine speed. In this embodiment, a first pump absorption torque characteristic (=the first pump absorption torque characteristic line indicated by solid line La in FIG. 2) is set for the speed ratio e of the torque converter $2 \leq 0.4$, and a second pump absorption torque characteristic (=the second pump absorption torque characteristic line indicated by dashed line Lb in FIG. 2) is set for the speed ratio e of the torque converter $2 \geq 0.7$. While the number of pump absorption torque characteristics is two in this embodiment, the invention is equally applicable to cases where many pump absorption torque characteristics are set in accordance with the speed ratio e of the torque converter 2.

The first control unit 45*c* is designed to output a pump absorption torque command value which is determined based on an engine speed signal from the engine speed sensor 46 and torque converter speed ratio data from the speed ratio operation unit 45*b*. For example, if the speed ratio e of the torque converter 2 calculated in the speed ratio operation unit 45*b* is 0.4 or less and engine speed is Na, the first pump absorption torque characteristic line La will be selected and a pump absorption torque value Ta corresponding to the engine speed Na will be output as a pump absorption torque command value. If the speed ratio e of the torque converter 2 calculated in the speed ratio operation unit 45*b* is 0.7 or more and engine speed is Nb, the second pump absorption torque characteristic line Lb will be selected and a pump absorption torque value Tb corresponding to the engine speed Nb will be output as a pump absorption torque command value.

It should be noted that if the speed ratio e of the torque converter 2 calculated in the speed ratio operation unit 45*b* is greater than 0.4 and smaller than 0.7, the first control unit 45*c* outputs a pump absorption torque command value according to the first pump absorption torque characteristic line La. For example, if the speed ratio e of the torque converter 2 is 0.6 and engine speed is Nf, the first control unit 45*c* will output a pump absorption torque value Tf corresponding to the engine speed Nf as a pump absorption torque command value according to the first pump absorption torque characteristic line La.

Input to the second control unit 45*d* is the pump absorption torque command value from the first control unit 45*c*. In the second control unit 45*d*, a collection of control current values for the control valve 34 is stored in conjunction with pump absorption torque command values. The second control unit 45*d* outputs a control current to the control valve 34, which control current matches with a control current value determined based on a pump absorption torque command value from the first control unit 45*c*. For example, if the pump absorption torque command value from the first control unit 45c is Ta, a control current Ia, which matches with a control current value Ia corresponding to the pump absorption torque command value Ta, will be output to the control valve 34. If the pump absorption torque command value from the first control unit 45c is Tb, a control current Ib, which matches with a control current value Ib corresponding to the pump absorption torque command value Tb, will be output to the control valve 34.

Figure 3:
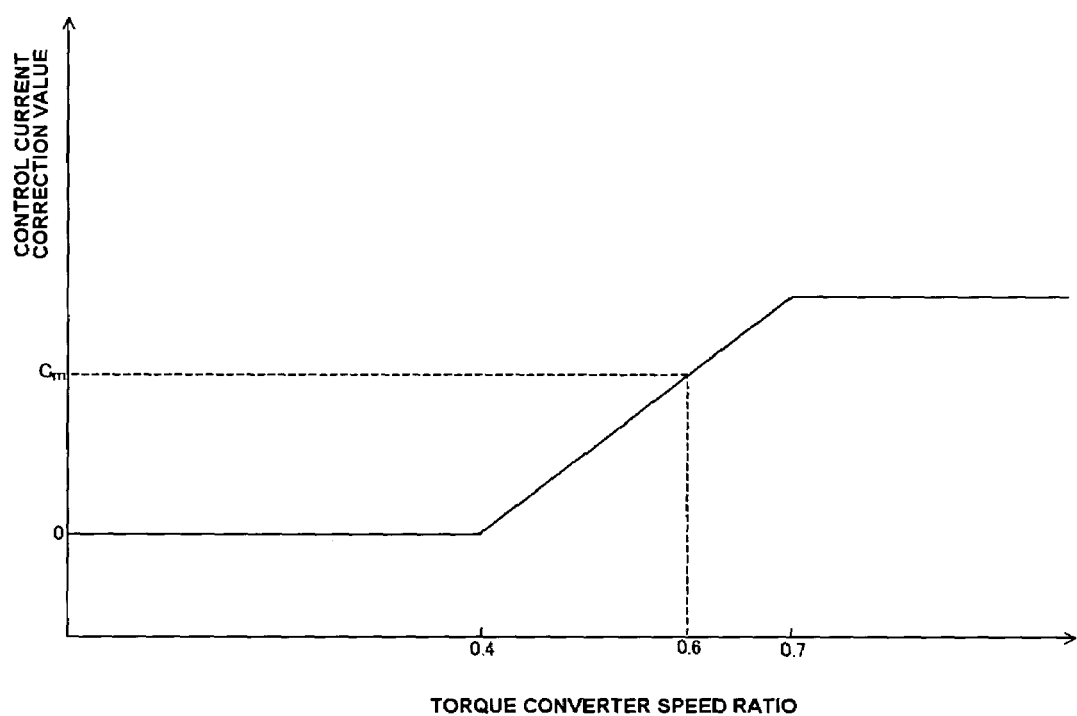
FIG. 3 is a graph showing the speed ratio of a torque converter verses control current correction values.
Figure 4:
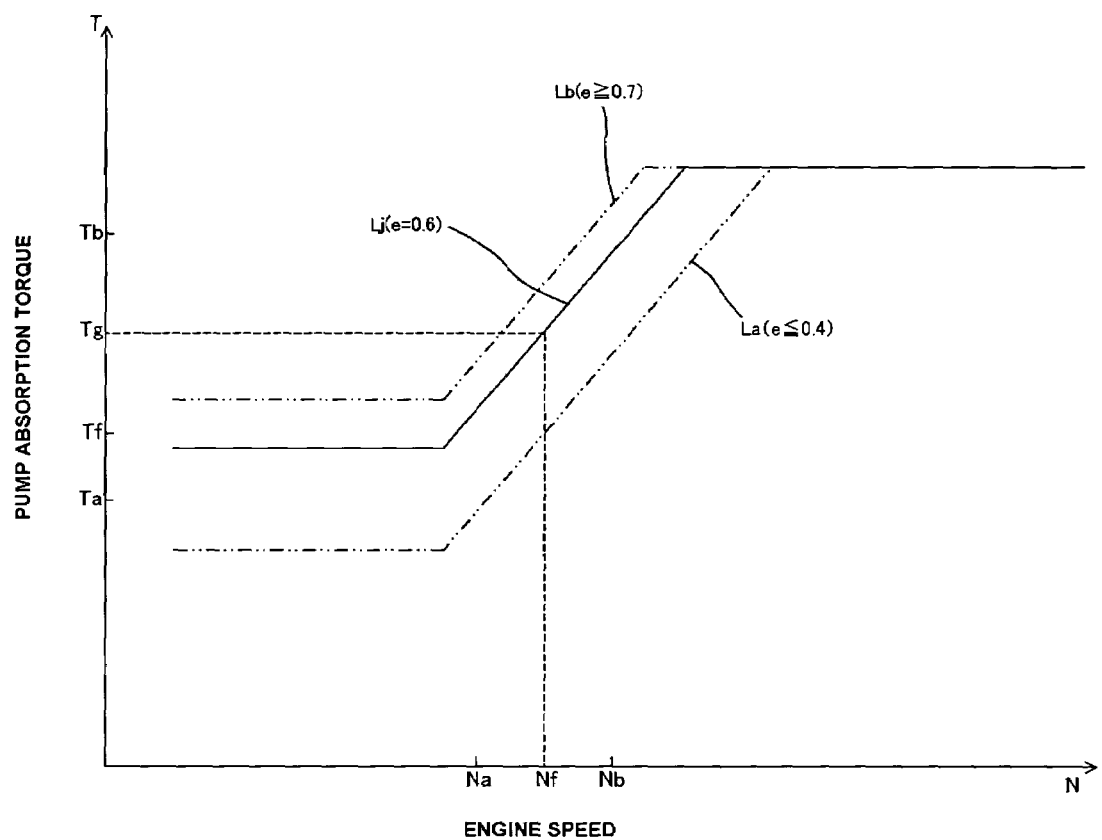
FIG. 4 is a graph showing a pump absorption torque characteristic where the speed ratio of the torque converter is 0.6.
Figure 5:
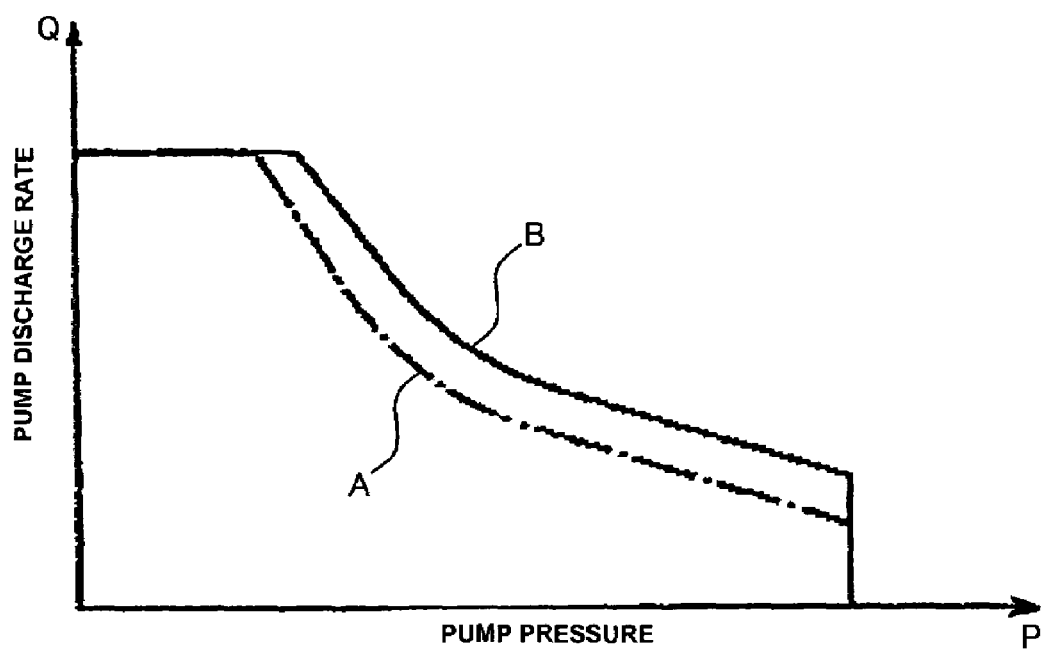
FIG. 5 is a P-Q graph showing pump pressure verses pump discharge rate.

The second control unit 45d stores the relationship between the speed ratio of the torque converter 2 and control current correction values such as shown in FIG. 3. The second control unit 45d is designed such that, if the speed ratio e of the torque converter 2 calculated by the speed ratio operation unit 45b is greater than 0.4 and smaller than 0.7, a control current value corresponding to the pump absorption torque command value from the first control unit 45c is obtained by looking up the relationship between pump absorption torque command values and control current values shown in FIG. 2. At the same time, a control current correction value is obtained by looking up the relationship between the speed ratio of the torque converter 2 and control current correction values shown in FIG. 3 with the result of the calculation performed by the speed ratio operation unit 45b; the result of subtraction of the latter value (i.e., the control current correction value) from the former value (i.e., the control current value) is newly set as a control current value; and the control current matching with the newly set control current value is output to the control value 34. For example, if the speed ratio e of the torque converter 2 calculated by the speed ratio operation unit 45b is 0.6 and engine speed is Nf, Tf is input to the second control unit 45d as a pump absorption torque command value from the first control unit 45c. Then, the second control unit 45d obtains a control current value If corresponding to the pump absorption torque command value Tf by looking up the relationship between pump absorption torque command values and control current values shown in FIG. 2, while obtaining a control current correction value Cm corresponding to the speed ratio e=0.6 by looking up the relationship between the speed ratio of the torque converter 2 and control current correction values shown in FIG. 3. Then, the result of subtraction (If−Cm) of the latter control current correction value Cm from the former control current value If is newly set as a control current value Ig (=If−Cm); and a control current Ig matching with the set control current value Ig is output to the control valve 34. In this way, a pump absorption torque characteristic line Lj such as shown in FIG. 4 is set.

Reference is made to FIGS. 1 to 6 to hereinafter describe operation of the bulldozer with a hydrostatic steering system having the above-described structure.

First of all, the regulator for controlling the swash plate angle of the hydraulic pump 7 will be explained. When a pump pressure P1 of the hydraulic pump 7 shown in FIG. 1 is transmitted through the first conduit 27, working upon the operating section 28a of the LS valve 28, while the highest pressure P2, which has been selected by the highest pressure selecting type shuttle valve 33 from the load pressures on the hydraulic cylinders 22 and the load pressure on the hydraulic motor 14, is transmitted through the third conduit 32, working upon the operating section 28b of the LS valve 28, the LS valve 28 is located at Position A provided that the pump pressure P1 is lower than the pump pressure P2 (P1<P2). If the pump pressure P1 of the hydraulic pump 7 works upon the operating section 29a of the TVC valve 29 through the first conduit 27 and this pump pressure P1 is low, the TVC valve 29 is then pushed by the springs 35 to Position A. Therefore, the control pressure working on the operating section 25a of the servo valve 25 drains into a tank from the LS valve 28 located at Position A by way of the TVC valve 29 located at Position A. This allows the servo valve 25 to be shifted to Position B and the control pressure from the hydraulic pump 7 to work upon the chamber B of the servo piston 24, after transmitted from the first conduit 27 to the servo valve 25 located at Position B. As a result, control is performed such that the servo piston 24 moves to the left, thereby increasing the swash plate angle of the hydraulic pump 7 to increase its pump discharge rate. When the pump pressure from the hydraulic pump 7 increases, it works upon the operating section 29a of the TVC valve 29 so that the TVC valve 29 is shifted to Position B. Then, the control pressure from the hydraulic pump 7 is transmitted from the second conduit 31 to the TVC valve 29 located at Position B and then to the LS valve 28 and thereafter works upon the operating section 25a of the servo valve 25. This allows the servo valve 25 to be shifted to Position A so that the control pressure from the hydraulic pump 7 works upon the chamber A of the servo piston 24 after transmitted from the first conduit 27 to the servo valve 25 located at Position A. As a result, the servo piston 24 moves to the right, thereby reducing the swash plate angle of the hydraulic pump 7 to reduce its pump discharge rate.

For example, if the speed ratio e of the torque converter 2 which is calculated by the speed ratio operation unit 45b is 0.4 or less and engine speed is Na, Ta is output as a pump absorption torque command value from the first control unit 45c to the second control unit 45d, and the control current Ia corresponding to the pump absorption torque command value Ta is output from the second control unit 45d to the control valve 34. Upon receipt of the control current Ia, the control valve 34 performs opening operation matching with the control current Ia. This allows the pump pressure from the hydraulic pump 7 to be controlled by the self-pressure control valve 30 inserted in the second conduit 31, and this control pressure is transmitted from the second conduit 31 to the control valve 34 to work upon the operating section 29a of the TVC valve 29. If the speed ratio e of the torque converter 2 which is calculated by the speed ratio operation unit 45b is 0.7 or more and engine speed is Nb, Tb is output as a pump absorption torque command value from the first control unit 45c to the second control unit 45d, and the control current value Ib corresponding to the pump absorption torque command value Tb is output from the second control unit 45d to the control valve 34. Upon receipt of the control current Ib, the control valve 34 performs opening operation matching with the control current Ib. This allows the pump pressure from the hydraulic pump 7 to be controlled by the self-pressure control valve 30 inserted in the second conduit 31, and this control pressure is transmitted from the second conduit 31 to the control valve 34 to work upon the operating section 29a of the TVC valve 29. Thus, the control pressure, which is fed through the control valve 34 whose opening is controlled according to a control current from the second control unit 45d, works upon the operating section 29a of the TVC valve 29, so that the TVC valve 29 is controlled. The two springs 35 provided for the TVC valve 29 bend, being pressed by the piston (not shown) of the TVC valve 29, while pushing the pressing member 36 to operate the servo piston 24 so that the swash plate angle of the hydraulic pump 7 is controlled. With this control, the discharge capacity of the hydraulic pump 7 becomes variable and the pump absorption horsepower is controlled as depicted by a substantially equivalent horsepower constant line (P·Q=constant). As a result, if the speed ratio e of the torque converter 2 calculated by the speed ratio operation unit 45b is 0.4 and engine speed is Na, the hydraulic pump 7 is controlled according to the P-Q line indicated by code A in FIG. 5. If the speed ratio e of the torque converter 2 calculated by the speed ratio operation unit 45b is 0.7 and engine speed is Nb, the hydraulic pump 7 is controlled according to the P-Q line indicated by code B in FIG. 5.

Figure 6:
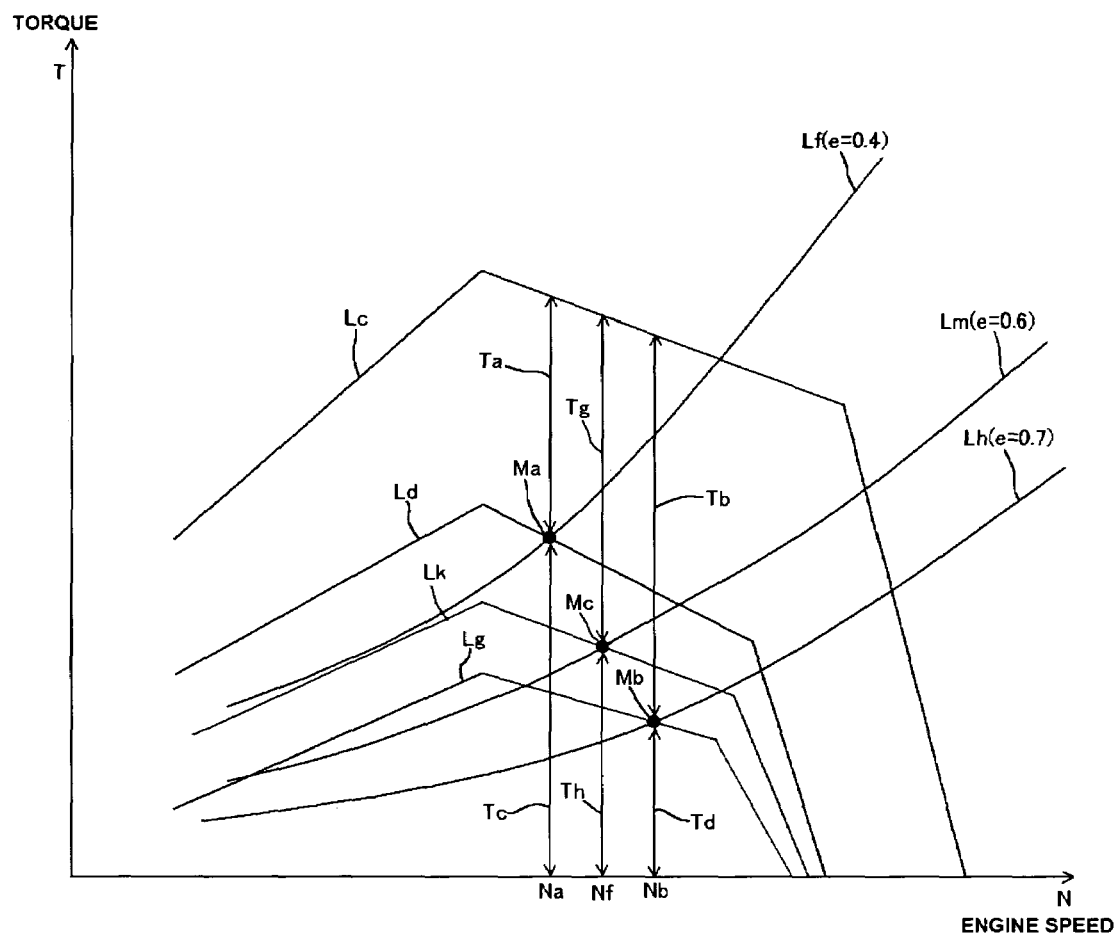
FIG. 6 shows torque characteristic curves for engine speed.

In cases where the speed ratio e of the torque converter 2 calculated by the speed ratio operation unit 45b is 0.4 or less, the pump absorption toque controlling means composed of the first control unit 45c and the second control unit 45d controls pump absorption torque according to the first pump absorption torque characteristic line La (See FIG. 4). Therefore, the effective output torque characteristic, which is obtained from subtraction of the pump absorption torque indicated by the pump absorption torque characteristic line La (See FIG. 4) from the engine output torque indicated by the engine output torque characteristic line Lc shown in FIG. 6, is indicated by the characteristic line Ld of FIG. 6 in relation to engine speed. At the point Ma (engine speed=Na), where the effective output torque characteristic line Ld intersects the absorption torque characteristic line Lf of the torque converter 2, the effective output torque Tc of the engine 1 matches with the absorption torque of the torque converter 2. At the matching point Ma, the hydraulic pump 7 absorbs horsepower from the engine 1, which horsepower is obtained by multiplying the product of the pump absorption torque Ta and the engine speed Na by a specified coefficient. On the other hand, the torque converter 2 absorbs horsepower from the engine 1 at the matching point Ma, which horsepower is obtained by multiplying the product of the effective output torque Tc and the engine speed Na by a specified coefficient.

Thus, where the speed ratio e of the torque converter 2 calculated by the speed ratio operation unit 45b is relatively small, that is, where running load is relatively high, the horsepower absorbed from the engine 1 by the torque converter 2 is preferentially increased by reducing the absorption torque of the hydraulic pump 7 with the pump absorption torque controlling means. This makes it possible to ensure traction ability, engine output recovery performance, etc. in preference to turning performance while keeping desired turning performance.

In cases where the speed ratio e of the torque converter 2 calculated by the speed ratio operation unit 45b is 0.7 or more, the pump absorption toque controlling means composed of the first control unit 45c and the second control unit 45d controls pump absorption torque according to the second pump absorption torque characteristic line Lb (See FIG. 4). Therefore, the effective output torque characteristic, which is obtained from subtraction of the pump absorption torque indicated by the pump absorption torque characteristic line Lb (See FIG. 4) from the engine output torque indicated by the engine output torque characteristic line Lc shown in FIG. 6, is indicated by the characteristic line Lg of FIG. 6 in relation to engine speed. At the point Mb (engine speed=Nb), where the effective output torque characteristic line Lg intersects the absorption torque characteristic line Lh of the torque converter 2, the effective output torque Td of the engine 1 matches with the absorption torque of the torque converter 2. At the matching point Mb, the hydraulic pump 7 absorbs horsepower from the engine 1, which horsepower is obtained by multiplying the product of the pump absorption torque Tb and the engine speed Nb by a specified coefficient. On the other hand, the torque converter 2 absorbs horsepower from the engine 1 at the matching point Mb, which horsepower is obtained by multiplying the product of the effective output torque Td and the engine speed Nb by a specified coefficient.

Thus, where the speed ratio e of the torque converter 2 calculated by the speed ratio operation unit 45b is relatively great, that is, where running load is relatively low, the horsepower absorbed from the engine 1 by the hydraulic pump 7 is preferentially increased by increasing the absorption torque of the hydraulic pump 7 with the pump absorption torque controlling means, so that the amount of pressure oil flowing from the hydraulic pump 7 to the hydraulic motor 14, various hydraulic cylinders 22, etc. increases. This makes it possible to ensure turning performance and the speed of the implement in preference to traction ability, engine output recovery performance, etc.

In cases where the speed ratio e of the torque converter 2 calculated by the speed ratio operation unit 45b is within the range greater than 0.4 and smaller than 0.7, say, 0.6, the pump absorption toque controlling means controls pump absorption torque according to the pump absorption torque characteristic line Lj shown in FIG. 4. Therefore, the effective output torque characteristic, which is obtained from subtraction of the pump absorption torque indicated by the pump absorption torque characteristic line Lj (See FIG. 4) from the engine output torque indicated by the engine output torque characteristic line Lc shown in FIG. 6, is indicated by the characteristic line Lk of FIG. 6 in relation to engine speed. At the point Mc (engine speed=Nf), where the effective output torque characteristic line Lk intersects the absorption torque characteristic line Lm of the torque converter 2, the effective output torque Th of the engine 1 matches with the absorption torque of the torque converter 2. At the matching point Mc, the hydraulic pump 7 absorbs horsepower from the engine 1, which horsepower is obtained by multiplying the product of the pump absorption torque Tg and the engine speed Nf by a specified coefficient. On the other hand, the torque converter 2 absorbs horsepower from the engine 1 at the matching point Mc, which horsepower is obtained by multiplying the product of the effective output torque Th and the engine speed Nf by a specified coefficient.

According to the present embodiment, the absorption torque of the hydraulic pump 7 is controlled by the pump absorption torque controlling means composed of the first control unit 45c and the second control unit 45d, based on the speed ratio e of the torque converter 2 which decreases and increases according to an increase and drop in running load. This enables optimum control of the absorption torque of the hydraulic pump 7 according to running load.

While the speed ratio e of the torque converter 2 is obtained by use of Equation (1) including the reduction ratio i of the transmission 3 in the present embodiment, the invention is not limited to this but equally applicable to cases where the output shaft speed of the torque converter 2 is directly detected with the transmission output shaft speed sensor 47 placed between the torque converter 2 and the transmission 3 and the speed ratio e of the torque converter 2 is obtained from the ratio of the detected output shaft speed $N_2$ of the torque converter 2 to the input shaft speed (=engine speed) $N_1$ of the torque converter 2 ($N_2/N_1$). This obviates the need for calculation of the reduction ratio i by the speed ratio operation unit 45b and therefore the need for the drive/speed gear identifying unit 45a and the clutch operation detectors 44, so that simplification of the system configuration can be achieved. In addition, integration of the first control unit 45c and the second control unit 45d is possible, which also leads to simplification of the system configuration.

The invention claimed is:

1. A work vehicle with a hydrostatic steering system in which the power of an engine is transmitted to right and left drive wheels through at least a torque converter and differential steering means, whereas the power of a hydraulic motor, which is driven by pressure oil from a hydraulic pump operated by the engine, is transmitted to said right and left drive wheels through said differential steering means, said work vehicle comprising:

speed ratio computing means for computing a speed ratio of the torque converter; and pump absorption torque controlling means for controlling torque absorbed by the hydraulic pump based on the speed ratio computed by the speed ratio computing means.

2. The work vehicle with a hydrostatic steering system according to claim 1, wherein said hydraulic pump is a variable displacement hydraulic pump whose discharge rate varies according to changes in its swash plate angle;

which further includes a regulator for controlling the swash plate angle of the variable displacement hydraulic pump, a control valve for controlling the operation of said regulator in response to a supply of a control current, and an engine speed sensor for detecting the actual engine speed of said engine; and wherein said pump absorption torque controlling means includes a first control unit and a second control unit, the first control unit performing operation in which an absorption torque value indicating the amount of torque which said hydraulic pump should absorb is obtained by looking up data on the relationship between engine speed and absorption torque values indicating the amounts of torque which said hydraulic pump should absorb with an actual engine speed detected by said engine speed sensor, said data being prestored in accordance with the speed ratio of said torque converter, and the obtained absorption torque value is output as a pump absorption torque command value; and the second control unit performing operation in which a control current value for said control valve is obtained by looking up prestored data on the relationship between pump absorption torque command values and control current values with a pump absorption torque command value sent from the first control unit, and a control current matching with the obtained control current value is output to said control valve.

* * * * *